July 15, 1947. J. J. BLACK 2,424,141
SPRING SUSPENSION FOR TANDEM AXLE VEHICLES
Filed Jan. 3, 1945
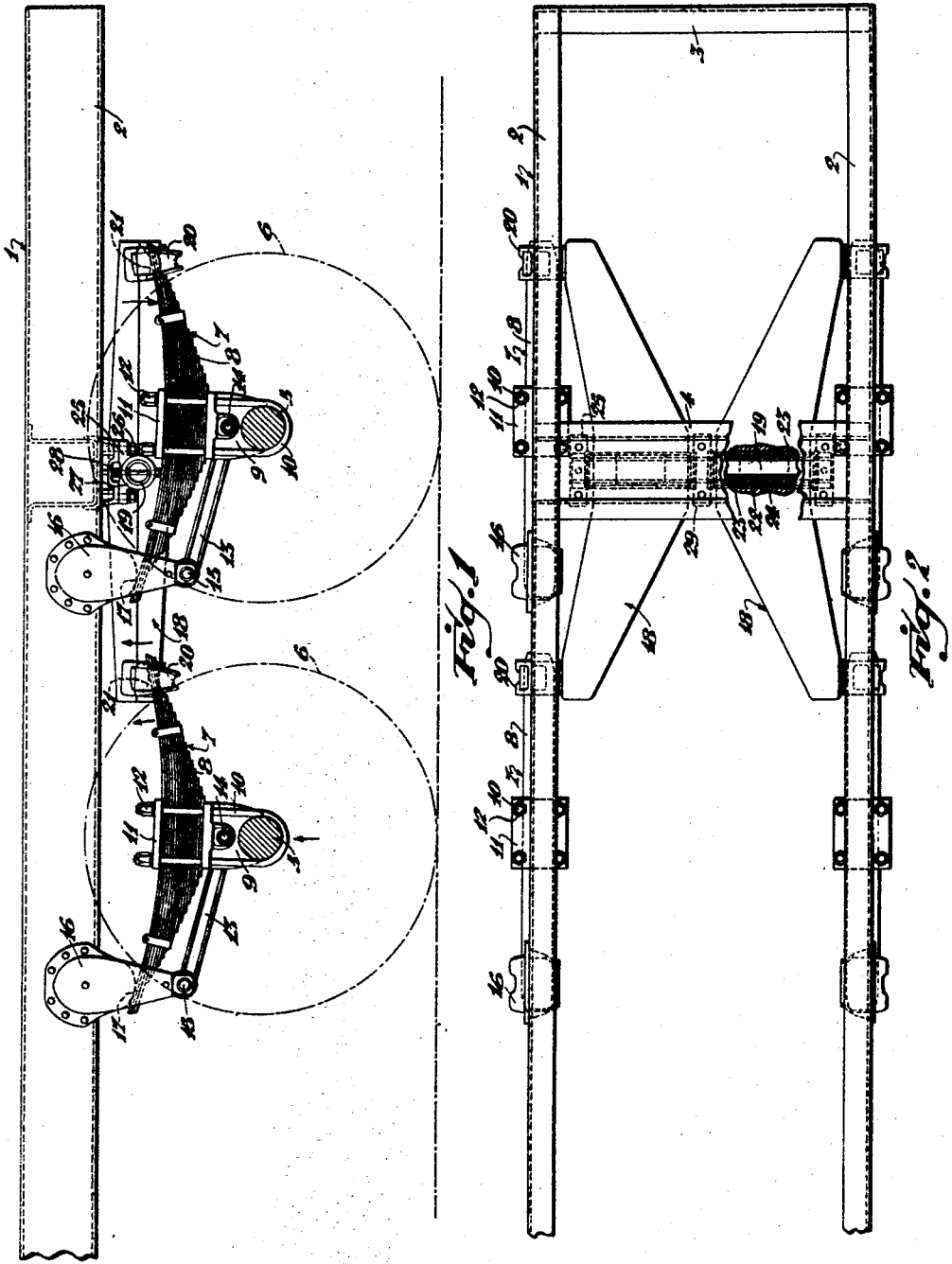
INVENTOR.
James J. Black
BY
Wood, Arey, Herron & Evans
Attorneys.

Patented July 15, 1947

2,424,141

UNITED STATES PATENT OFFICE 2,424,141

SPRING SUSPENSION FOR TANDEM AXLE VEHICLES

James J. Black, Cincinnati, Ohio, assignor to The Trailmobile Company, Cincinnati, Ohio, a corporation of Delaware Application January 3, 1945, Serial No. 571,161

10 Claims. (Cl. 280—104.5)

1

This invention relates to trailer vehicles and it is directed particularly to trailers having dual axles and wheels arranged in tandem.

The principal objective of the invention has been to provide improvements in the spring suspension of the axles, including interconnections between the tandem springs, whereby they are caused to be coactive such that the loads or shocks to which the springs otherwise would be subjected unequally, because of variations in the roadway or variations in braking effect, may be distributed and divided between the springs.

Interconnection springs of a tandem pair for the purpose of equalizing loads due to roadway variations only heretofore has been proposed, as in the Marcum Patent No. 1,744,401 of January 21, 1930. However, in the arrangement shown in that patent the wheels are driven through a torque tube and no mechanism is furnished for accommodation of the variations in spring loading due to brake reactions. This invention contemplates a structure in which loads of both types are distributed through a mechanism employing a minimum number of moving parts and minimum movement of the parts. Due to the fact that the springs and suspension assembly of a trailer vehicle cannot be well protected against dust and grit, each point at which movement occurs is an area exposed to extreme wear conditions. Many mechanical linkages which otherwise would be suitable cannot be employed because they wear out much too soon.

A still further objective of the invention has been to provide for interconnection and co-action between the springs in a strong and compact assembly in which a number of duplicate parts are employed for interchangeability and attendant reduction in the cost of manufacture of the apparatus. In this respect the invention contemplates rocker members, one for each pair of springs, which are mounted within the trailer chassis whereby the structure is free of members or parts which overhang the wheels or extend outwardly beyond the frame. The arrangement permits the wheels to be situated closely adjacent the side rails and the frame therefor may be of increased width without increasing the over-all width of the unit.

The construction also permits the pivot point or axis about which the rocker members are movable to be situated in relation to the springs in such manner that all of the parts move effectively for coaction only through limited distances.

Other objectives of the invention and further advantages appear in the following detailed description of the drawings in which a preferred embodiment of the improvement is disclosed.

In the drawings:

Figure 1 is a side elevation of the suspension apparatus.

Figure 2 is a top plan view looking down upon the apparatus from the trailer frame.

The frame or chassis of the trailer, indicated generally at 1, is of the usual type comprising side channels 3, and cross bolsters 4 which also are in the form of channel members fastened rigidly to the sides 2. The axles of the vehicles are indicated generally at 5. These are arranged in pairs, each axle being spaced from the other a distance sufficient to provide for clearance of the wheels which are journalled upon them. In the drawings the wheels are indicated by the dot-dash lines 6. Each axle may carry one or more wheels at each of its ends in the usual manner depending upon maximum permissible wheel loadings. The wheels are provided with brakes (not shown).

Each axle has attached to it a spring assembly indicated generally at 7. The spring leaves 8 rest upon a bracket 9 which engages the upper surface of the axle while U bolts 10 extend around the axle, and upwardly along the sides of the assembly of leaves. At their upper ends the U bolts pass through pads 11 beyond which they carry nuts 12 whereby the springs are clamped rigidly to the axle members 5.

This construction is exemplary of those which heretofore have been employed. It is also to be noted that the usual radius rods 13 are employed, one end of each being pivotally mounted on a stud 14 passing through spring bracket 9 while the other end is supported on a stud 15 extending from a bracket 16 mounted on side member 2 of the trailer chassis. The radius rods maintain the positions of the axles relative to the trailer chassis in a direction longitudinally thereof, yet allow the wheels to move up and down.

Brackets 16 provide lower contact faces 17 which are engaged respectively by one end of each spring assembly. These contact faces are curved arcuately so that as the springs move up and down a rolling action takes place between the springs and contact surfaces to minimize wear.

In accordance with the present invention the opposite ends of the springs are interconnected one with the other through rocker members indicated generally at 18. These comprise elongated levers supported preferably by a cross shaft 19 which, in turn, is supported from the trailer frame.

In the embodiment disclosed each rocker arm 18 has a bracket 20 extending outwardly therefrom adjacent each end, and each bracket 20 has an arcuately curved contact surface 21 positioned for engagement with a spring assembly 7 so that it forms a rolling contact with the spring. The central portions of the rocker arms are offset from the brackets 20, one suitable construction being that of generally shallow V-shape as shown in Figure 2. The rocker members are of box-like construction either forged or fabricated inexpensively by welding sheet metal of suitable strength. At a point intermediate the brackets 21, and preferably at a central point, the rocker arms are bored transversely to receive bushings 22, by which they are supported.

It is to be noted that each rocker member principally resides inwardly of the side rails of the trailer frame with respect to the pair of springs which it accommodates; thus the spring coaction assembly is housed underneath the trailer instead of at points beyond the trailer side rails as in past construction. This provides a compact arrangement and also permits greater wheel clearances at the outside of the trailer without interference from transfer bars, reach rods, journals, ball cranks, or the like.

The bushings 22 of the rocker arms 18 receive the cross shaft 19. In the preferred construction the cross shaft 19 is of smaller diameter than the bushings 22 and intermediate bushings 23 are installed within the bushings 22 to form journals for the rocker arms upon the cross shaft 19. The inner ends of the intermediate bushings 23 however are spaced apart to leave an intermediate annular recess 24 of substantial length which is adapted to be filled with grease and thereby serve as a reservoir through which proper lubrication of the rocker journals is maintained.

The endwise portions of the cross shaft 19 extend beyond the outer faces of the rocker bars 18, at which points the cross shaft is supported upon blocks 25 fastened rigidly to the bolster 4 by means of bolts 26. The cross shaft is prevented from moving longitudinally by means of collars 27 placed at the outer faces of the blocks 25 and connected to the cross shaft by means of bolts 28 extending therethrough. The cross shaft at its central portion intermediate the inner faces of the rocker arms 18 additionally is supported by a block 29, similar to blocks 25. The inward spacing of the rocker bars and the offset in them furnishes an area between the inner face of each side rail 2 and the outer face of each adjacent rocker bar 18 within which the blocks 25 conveniently are loacted.

In the operation of the vehicle the rocker arm distributes to both of the springs the load to which one spring, otherwise, individually would be subjected whereby each is caused to carry a portion of the total load. For instance, as one of the wheels hits a bump in the road it may move upwardly lifting that end of the rocker bar which is in engagement with it whereby the opposite end of the rocker bar moves downwardly to press upon the other spring. A converse action takes place when or if the second wheel of the tandem pair hits the bump. Similar distribution of spring loading takes place when the wheel brakes are applied.

The rocker bars in the preferred construction are movable independently of one another, that is, the bar at one side of the vehicle is shiftable without causing a corresponding shifting movement of the rocker bar in the other side, though each is mounted upon a common shaft and both, if desirable, may be interconnected or integrated for movement in unison.

In the event that any rocker bars reach their limits of movement, the load is then transferred to the axle, the spring of which is resting on the bracket against the frame. The other axle is thereby relieved of a part of its load and the overloaded spring is allowed to deflect which permits the vehicle to pass over a large obstruction without being damaged.

Having described my invention, I claim:

1. A trailer vehicle comprising a frame having a pair of axles arranged in tandem, each axle being yieldably suspended from the frame through an elongated spring having one end supported by said frame and a rockable member supported by said frame interiorly thereof, said rockable member having outwardly projecting portions respectively supporting the opposite ends of said springs.

2. A trailer vehicle comprising a frame having axles arranged in tandem, elongated leaf springs extending longitudinally of said frame, one for each axle, means for supporting one end of each spring from said frame, and means common to the opposite ends of said springs for supporting said opposite ends, comprising a rockable member pivotally mounted upon said frame at a point intermediate the said opposite ends of said springs and within said trailer frame, said pivotal mounting being of substantial width and extending from a point adjacent the side rail of the frame substantially to the longitudinal center line of said frame.

3. A trailer vehicle comprising a frame, a pair of axles, elongated spring means for flexibly interconnecting the said axles with the frame, and a load transferring member for effecting coaction of the springs one with another, comprising a rocker member pivotally mounted on said frame at a point interiorly of the frame and adjacent the inner side of said spring means, said rocker member having outwardly projecting portions at opposite sides of its pivotal axis respectively engaging corresponding portions of said springs.

4. A trailer vehicle comprising a frame, a pair of leaf springs supported by said frame, and a load transferring member having portions common to said springs and being in engagement therewith at their opposite ends, said load transferring member being pivotally mounted upon said frame at a point interiorly of the frame upon an axis intermediate the points of engagement of said member with said springs, the point of pivotal support of said load transferring member being at approximately the same height from the ground as the points of engagement of said member with said springs so that fore and aft movement between the springs and the points of engagement therewith is eliminated.

5. A trailer vehicle comprising a frame having side members spaced apart from one another, a cross shaft, rocker members rockably mounted upon said cross shaft adjacent one another within said side members, the bearing portions of said rocker members which are rockably mounted on the cross shaft being of substantial width and extending respectively from points adjacent the side rails of the frame to substantially the longitudinal center line of the frame, axles arranged in tandem and spring means for yieldably supporting said axles with respect to said frame, said rocker members being common to said spring means and forming interconnections between said springs through which loads to which said springs are subjected individually are distributed between said springs.

6. A trailer vehicle comprising a frame having a side rail, a rocker member pivotally mounted on said frame at one side of said rail and having supporting members extending therefrom at its opposite ends toward the opposite side of said side rail, and elongated spring members respectively having corresponding endwise portions thereof engaging said supporting members and opposite endwise portions thereof in supported engagement with said trailer frame.

7. A trailer vehicle comprising a frame, a pair of leaf springs each supported from said frame at one end thereof, a rocker member pivotally mounted on said frame with its opposite ends in supporting engagement with the opposite ends of said leaf springs, said rocker member being in the form of an elongated V mounted within said trailer frame and having projections extending therefrom toward the exterior of said trailer frame into connection with said springs.

8. A trailer vehicle comprising a frame having side walls and a cross bolster, a shaft extending crosswise of said trailer and supported at its opposite ends by said bolster, spring situated substantially beneath the said side walls of the frame, means for supporting one end of each spring from said frame and a transfer member rockable about the axis of said shaft and having portions extending therefrom into engagement with the opposite ends of said springs.

9. A trailer vehicle comprising, a frame including side rails, axles arranged in tandem, springs for mounting said frame on said axles, means for supporting corresponding ends of said springs, rocker members pivotally mounted on said frame and having their respective ends engaging the opposite and corresponding ends of said springs, said rocker members disposed beneath the trailer frame and between laterally adjacent springs, the pivotal mounting of said rocker members being of substantial width and lying in approximately the same plane as the points of spring support between the rocker members and the springs, said rocker members further including outwardly laterally extended support portions directly contacting the springs.

10. A trailer vehicle comprising, a frame including side rails, axles arranged in tandem, springs for mounting said frame on said axles, means for supporting the opposite and corresponding ends of said springs, rocker members pivotally mounted on said frame and having their respective ends engaging corresponding ends of said springs, said rocker members disposed beneath the trailer and between laterally adjacent springs, and the pivotal mounting of said rocker members being of substantial width.

JAMES J. BLACK.

REFERENCES CITED

The following references are of record in the file of this patent:

UNITED STATES PATENTS

| Number | Name | Date |
|---|---|---|
| 1,763,767 | Fageol | June 17, 1930 |
| 1,928,860 | Marcum | Oct. 3, 1933 |
| 1,745,431 | Marcum | Feb. 4, 1930 |
| 1,861,111 | Cason | May 31, 1932 |
| 1,881,070 | Falk | Oct. 4, 1932 |